US012000750B2

(12) United States Patent
Sches et al.

(10) Patent No.: US 12,000,750 B2
(45) Date of Patent: Jun. 4, 2024

(54) METHOD FOR ASSESSING THE QUALITY OF THE COUPLING OF TWO TUBULAR COMPONENTS

(71) Applicant: VALLOUREC OIL AND GAS FRANCE, Aulnoye-aymeries (FR)

(72) Inventors: Celine Sches, Boulogne-Billancourt (FR); Denis Bourlart, Boulogne-Billancourt (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 639 days.

(21) Appl. No.: 17/044,096

(22) PCT Filed: Apr. 9, 2019

(86) PCT No.: PCT/FR2019/050828
§ 371 (c)(1),
(2) Date: Sep. 30, 2020

(87) PCT Pub. No.: WO2019/197772
PCT Pub. Date: Oct. 17, 2019

(65) Prior Publication Data
US 2021/0088396 A1 Mar. 25, 2021

(30) Foreign Application Priority Data

Apr. 10, 2018 (FR) ...................... 1853137

(51) Int. Cl.
*G01L 5/24* (2006.01)
*B23P 11/00* (2006.01)
(Continued)

(52) U.S. Cl.
CPC ................ *G01L 5/24* (2013.01); *B23P 11/00* (2013.01); *E21B 17/042* (2013.01);
(Continued)

(58) Field of Classification Search
CPC .. G01L 5/24; B23P 11/00; E21B 19/165–166; F16L 15/001; F16L 2201/10; Y10T 29/49766–49767
See application file for complete search history.

(56) References Cited

U.S. PATENT DOCUMENTS 4,102,182 A 7/1978 Brown et al.
4,375,121 A 3/1983 Sigmund
(Continued)

FOREIGN PATENT DOCUMENTS

DE 102016208852 A1 * 11/2017

OTHER PUBLICATIONS

Translation of DE-102016208852-A1 (Year: 2017).*
International Search Report dated Jun. 17, 2019 in PCT/FR2019/050828 filed Apr. 9, 2019, 2 pages.

*Primary Examiner* — Matthew P Travers
(74) *Attorney, Agent, or Firm* — Oblon, McClelland, Maier & Neustadt, L.L.P.

(57) ABSTRACT

A method for coupling a first tubular component including a threaded portion with a second tubular component including a threaded portion, which includes: engaging the first tubular component on the second tubular component; rotating the first tubular component relative to the second tubular component in order to screw the threaded portions together; obtaining a set of points constituting a curve that represents the torque applied during the screwing of the first tubular component until an end position as a function of the number of turns performed by the first tubular component relative to the second tubular component; comparing parameters of the curve obtained with one or more reference curve(s) of a database in which each reference curve is associated with an assessment of the quality of the coupling; and assessing the quality of the coupling according to the step of comparing the curve.

13 Claims, 3 Drawing Sheets

(51) Int. Cl.
*E21B 17/042* (2006.01)
*E21B 19/16* (2006.01)
*F16L 15/00* (2006.01)

(52) U.S. Cl.
CPC .......... *E21B 19/165* (2013.01); *F16L 15/001* (2013.01); *E21B 19/164* (2013.01); *F16L 2201/10* (2013.01)

(56) References Cited

U.S. PATENT DOCUMENTS

| | | | | |
|---|---|---|---|---|
| 4,413,396 A | * | 11/1983 | Wallace | B25B 23/14 |
| | | | | 29/407.03 |
| 4,685,050 A | | 8/1987 | Polzer et al. | |
| 10,817,527 B1 | * | 10/2020 | Setlur | G06F 16/90332 |
| 2014/0116687 A1 | * | 5/2014 | Ruehmann | E21B 19/166 |
| | | | | 166/250.01 |
| 2016/0187213 A1 | | 6/2016 | Morgue et al. | |
| 2018/0224029 A1 | * | 8/2018 | Ruehmann | E21B 19/166 |

* cited by examiner

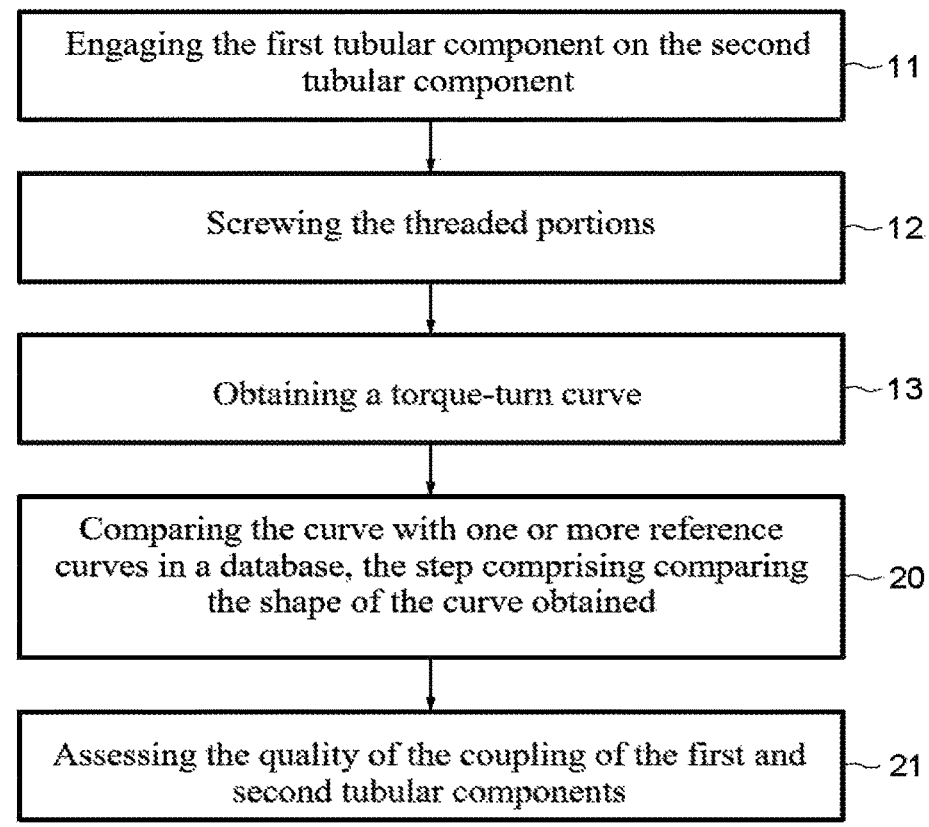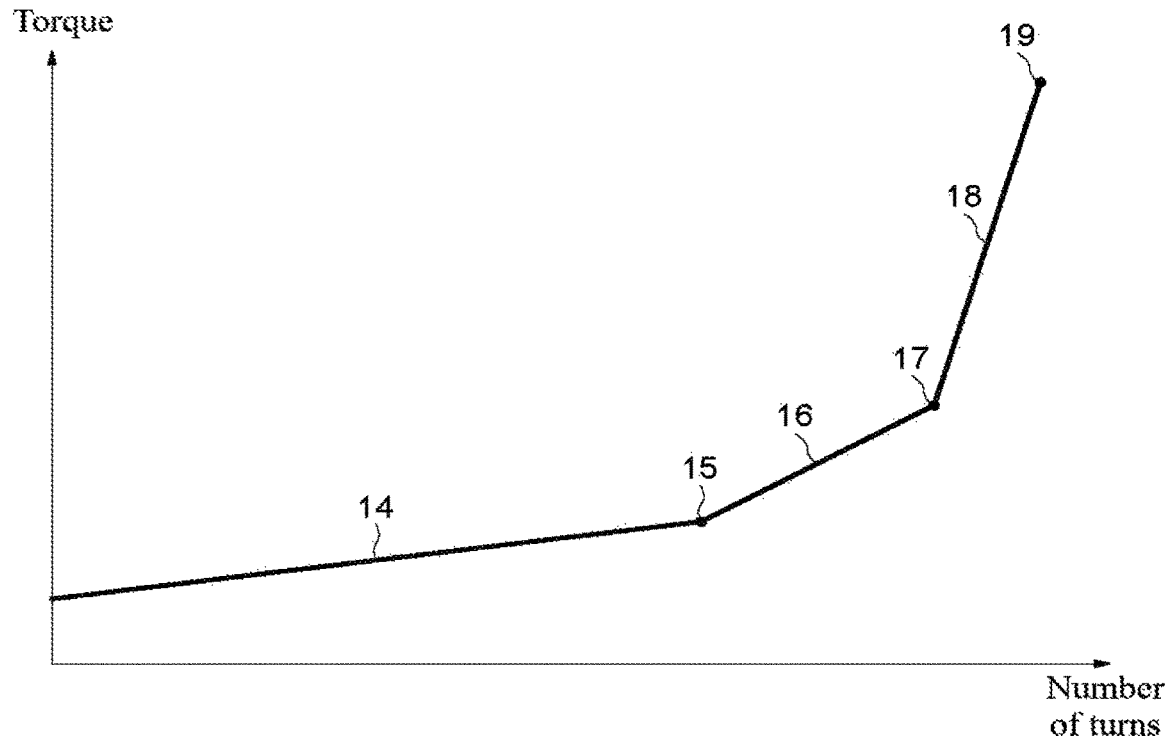

METHOD FOR ASSESSING THE QUALITY OF THE COUPLING OF TWO TUBULAR COMPONENTS

The present invention relates, in general, to tubular components comprising a threaded portion and, more specifically, to a method for coupling a threaded portion of a first tubular component with a threaded portion of a second tubular component.

More particularly, the invention relates to a method for assessing the quality of the coupling of a first tubular component comprising a threaded portion with a second tubular component comprising a threaded portion.

In the oil and gas industry, whether within the scope of offshore or onshore activities involving well drilling and extraction operations, the operations carried out comprise coupling tubular components with one another and lowering same into wells to produce drill strings or casing strings for oil or gas rigs.

A male or female threaded portion disposed at one end of a first tubular component can be directly coupled with a complementary threaded portion of a second tubular component.

According to another case, the first and second tubular components can be indirectly coupled by means of an intermediate tubular component, such as a coupling.

The tubular components are assembled under defined stresses in order to satisfy the clamping and sealing requirements imposed by the conditions of use, to guarantee the integrity of the assembly during use throughout the life thereof.

However, the coupling may be produced incorrectly, which can damage the tubular components or result in the premature separation thereof.

The quality of the screwing thus has a direct impact on the sealing and durability of the tubular component assembly. The quality of the coupling produced must thus be assessed by validating or invalidating the conformity of the screwing operation carried out.

Conventionally, the tools intended for coupling tubular components comprise sensors configured to determine the torque applied during screwing, as well as the number of turns of the first tubular component relative to the second tubular component. These tools are used to trace a curve representing the evolution of the value of the torque as a function of the number of turns carried out during assembly, generally referred to as a "screwing curve".

U.S. patent No. 2014/071056 discloses a method for coupling a first and a second threaded tubular component each including a shoulder. The torque applied and the number of turns performed during coupling are measured. The coupling is then assessed as a function of the following parameters: the value of the torque when the shoulder of the first tubular component comes into contact with the shoulder of the second tubular component; the number of turns performed by the first tubular component from the time of contact between the shoulder of the first tubular component and the shoulder of the second tubular component until reaching the end position of the tubular components; the gradient of the portion of the curve from the time of contact between the shoulder of the first tubular component and the shoulder of the second tubular component until reaching the end position; and the value of the torque in the end position. Each of these parameters must lie within the range of a minimum value to a maximum value derived from reference curves.

However, the limited number of parameters taken into consideration does not allow all coupling scenarios to be interpreted and the probability of an unsatisfactory assessment remains high. There is thus a need to reduce this probability of an unsatisfactory assessment. Without additional human supervision, part of the couplings having failed can be wrongly considered to have been successful, and vice-versa. However, a poor coupling can have dramatic consequences as regards safety or the environment. There is thus a need to improve the techniques used for assessing the coupling of tubular components to improve the integrity of the string constituted thereby.

There is also a need for a method for carrying out reliable assessments in cases of both high and low sampling of the measuring points. More specifically, depending on the equipment used, a screwing curve can be drawn up with more than 3,000 measuring points or with fewer than 300 measuring points.

Most of the couplings produced require an additional verification carried out by a competent person. This person could thus be subjected to the risks related to his/her presence on the platform on which the coupling is made. Furthermore, the assessment according to known methods can slow the rate of the tube assembly and lowering operations conducted on the site.

The invention thus aims to overcome these drawbacks and relates to a method for coupling threaded tubular components resulting in an accurate and reliable assessment of the quality of the coupling.

The invention thus proposes a method for coupling a first tubular component including a threaded portion with a second tubular component including a threaded portion, which comprises: engaging the first tubular component on the second tubular component; rotating the first tubular component relative to the second tubular component in order to screw the threaded portions together; obtaining a set of points constituting a curve that represents the torque applied when screwing the first tubular component into an end position as a function of the number of turns performed by the first tubular component relative to the second tubular component; comparing one or more parameters of the curve obtained with one or more reference curves in a database in which each reference curve is associated with an assessment of the quality of the coupling of the first and second reference tubular components; and assessing the quality of the coupling of the first and second tubular components according to the step of comparing the curve obtained with the reference curves.

Moreover, the comparison step comprises comparing the shape of at least one portion of the curve obtained.

According to one feature, each reference curve in the database can be associated with a coupling status representative of the conform or non-conform status of the coupling of the first and second reference tubular components.

Preferably, the allocation of the coupling status of each reference curve in the database is carried out by human appraisal.

Advantageously, the comparison step comprises comparing the shape of the portion of the curve obtained from the engagement of the first tubular component on the second tubular component until contact is made between a first sealing surface of the first tubular component and a second sealing surface of the second tubular component, and/or of the portion of the curve obtained from the time of contact between the first sealing surface of the first tubular component and the second sealing surface of the second tubular component until contact is made between the first shoulder of the first tubular component and the second shoulder of the second tubular component, and/or of the portion of the curve obtained from the time of contact between the first shoulder of the first tubular component and the second shoulder of the second tubular component until the end position is reached.

Preferably, the comparison step and the assessment step are performed by an algorithm aided by machine learning using the database of reference curves, after obtaining the curve associated with the assessment of the quality of the coupling of the first and second tubular components, the curve obtained being added to the database.

Preferably, the algorithm aided by machine learning using the database of reference curves produces a result in the form of a probability of the validity of the curve obtained.

Advantageously, the algorithm is configured so as to compare the linearity of the portion of the curve obtained from the engagement of the first and second tubular components until contact is made between a first shoulder of the first tubular component and a second shoulder of the second tubular component with one or more reference curves in the database.

In an alternative embodiment, the algorithm is configured so as to compare the linearity of the portion of the curve obtained from the time of contact between the first sealing surface of the first tubular component and the second sealing surface of the second tubular component until contact is made between the first shoulder of the first tubular component and the second shoulder of the second tubular component.

In an alternative or complementary embodiment, the algorithm can be configured so as to compare the linearity of the portion of the curve obtained from the time of contact between the first shoulder of the first tubular component and the second shoulder of the second tubular component until reaching the end position.

Advantageously, the algorithm is configured so as to compare downward-sloping portions of the curve obtained with one or more reference curves in the database. In an alternative embodiment, the algorithm is configured so as to add up the torque losses for the portion of the curve between the engagement of the first tubular component on the second tubular component until contact is made between a first sealing surface of the first tubular component and a second sealing surface of the second tubular component. Moreover, the algorithm can be configured so as to obtain an average reference curve from the database of reference curves, and configured so as to calculate the average distance between the curve obtained and the average reference curve. Preferably, this distance is calculated from the bearing point, i.e. the point of contact between the first sealing surface of the first tubular component and the second sealing surface of the second tubular component. This distance is calculated with the L2 norm and thus by calculating, for each point assessed, the square root of the sum of squares of the components of the differential vector between the point on the normalised curve obtained and the point on the corresponding normalised reference curve.

The reference curves can be normalised relative to a final reference torque along the Y-axis, which is the final average torque of the reference curves, and along the X-axis by a reference rotation, which represents the number of rotations carried out between the start of the coupling and the time at which the final average reference torque is reached.

According to one embodiment, the algorithm can be configured so as to calculate and compare, with one or more reference curves in the database, the area of the triangle delimited by the portion of the curve obtained from the time of contact between a first sealing surface of the first tubular component and a second sealing surface of the second tubular component until contact is made between a first shoulder of the first tubular component and a second shoulder of the second tubular component, a straight line of zero gradient passing through the point of contact between the first sealing surface of the first tubular component and the second sealing surface of the second tubular component, and a vertical straight line passing through the point of contact between the first shoulder of the first tubular component and the second shoulder of the second tubular component, and/or configured so as to calculate the area of the triangle delimited by the portion of the curve obtained from the time of contact between the first shoulder of the first tubular component and the second shoulder of the second tubular component, a straight line of zero gradient passing through the point of contact between the first shoulder of the first tubular component and the second shoulder of the second tubular component, and a vertical straight line passing through the point on the curve obtained in the end position.

Preferentially, the algorithm is configured so as to calculate the length of the portion of the curve obtained from the time of contact between a first sealing surface of the first tubular component and a second sealing surface of the second tubular component until reaching the end position. In this manner, after comparing with one or more reference curves in the database, the algorithm can highlight abnormal torque variations or noise.

Moreover, the algorithm can be configured so as to carry out a principal component analysis performed based on a plurality of parameters of the curve obtained.

According to one feature, the algorithm can be configured so as to carry out data clustering, preferably k-means clustering and/or density-based clustering.

According to another feature, the algorithm can be of the t-SNE type.

According to one embodiment, the algorithm uses techniques chosen from among principal component analysis, k-means clustering, density-based clustering, and t-SNE analysis to produce clusters of reference curves and the algorithm applies said techniques to the curve obtained in order to classify same in one or more clusters of reference curves, then the algorithm determines, according to the classification of the curve obtained into the different clusters of curves, the probability of the validity of the curve obtained.

According to one embodiment, the algorithm can be configured so as to calculate the sum of the torque losses for the portion of curve located between the start of screwing and the bearing point.

Advantageously, the algorithm can be configured so as to compare the linearity of the portion of the curve obtained from the time of contact between the first shoulder of the first tubular component and the second shoulder of the second tubular component until reaching the end position.

Other purposes, advantages and features of the invention will appear upon reading the following description, which is provided for purposes of illustration only and given with reference to the accompanying drawings, wherein:

FIG. 2 shows a method for coupling a threaded portion of a first tubular component with a threaded portion of a second tubular component according to the invention;

FIG. 3 shows the torque applied when coupling a first and a second tubular component with one another as a function of the number of turns performed by the first tubular component relative to the second tubular component;

FIGS. 1A, 1B and 1C show different steps in the coupling of a first tubular component 1 with a second tubular component 2.

Figure 1A:
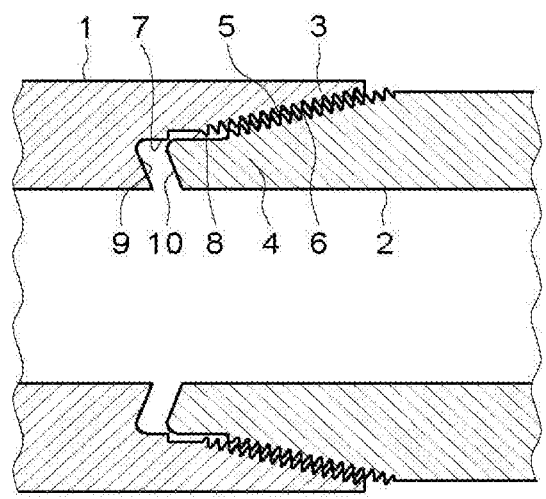
FIGS. 1A, 1B and 1C are sectional views of a first and a second tubular component to be coupled with one another, respectively in a screwing position, in a sealing position and in a shouldering position.

In the example shown, the tubular component 1 is a coupling of the sleeve type, configured so as to enable the second tubular component 2 to be coupled with a third tubular component not shown.

The first and second tubular components 1 and 2 comprise a threaded portion, respectively 3 and 4, advantageously disposed at one of the ends thereof. The threading 5 of the threaded portion 3 and the threading 6 of the threaded portion 4 are configured so as to cooperate with one another.

Moreover, the first tubular component 1 comprises a first sealing surface 7, and the second tubular component 2 comprises a second sealing surface 8. The sealing surfaces are formed by a face intended to ensure the sealing of the assembly of the tubular components 1 and 2 when coupled with one another.

The first tubular component 1 further comprises a first shoulder 9, and the second tubular component 2 comprises a second shoulder 10. The shoulders 9 and 10 form an abutment for stopping the screwing.

The sealing surfaces 7 and 8 and the shoulders 9 and 10 are configured so as to respectively cooperate with one another.

Tubular components that do not comprise an abutment exist. Tubular components that comprise neither an abutment nor a sealing surface exist. The aim of the invention is to be able to be applied partly to the coupling of these types of components, for the portions of the curve between the start of the coupling operation and the time of contact between the sealing surfaces, for the portion between the time of contact of the sealing surfaces and the end of the coupling operation, or between the start of the coupling operation and the end of the coupling operation, without contact being made between sealing surfaces or abutments during the coupling operation.

FIG. 2 shows a coupling method according to the invention. In order to couple the two tubular components 1 and 2, the method firstly comprises engaging 11 the first tubular component 1 on the second tubular component 2.

To screw the threaded portions 3 and 4 to one another, the first tubular component 1 is rotated 12 relative to the second tubular component 2.

The tool used to carry out the coupling is a torque wrench. This torque wrench is equipped with grips and motors for turning the first and second tubular components relative to one another. The torque wrench is also equipped with sensors for measuring the number of turns applied and the screwing torque applied. These sensors are connected to electronics to allow the applied torque and rotation data and data relating to the assembly to be stored during the operation. These electronics are connected to a processing unit comprising a processing algorithm. The processing unit is further equipped with a user interface to display an assessment result and/or the curve obtained during coupling.

The method further comprises obtaining 13 a set of points constituting a curve that represents the torque applied when screwing the first tubular component 1 into an end position as a function of the number of turns performed by the first tubular component 1 relative to the second tubular component 2.

The general profile of the curve obtained, referred to as a torque-turn curve, representing the torque applied during screwing as a function of the number of turns carried out, is shown in FIG. 3. The curve obtained can be seen to comprise three separate portions of different gradients.

The first portion 14 corresponds to the engagement of the first tubular component 1 on the second tubular component 2, then to the screwing of the threaded portions 3 and 4, as shown in FIG. 1A. The threadings 5 and 6 gradually come into contact with one another, resulting in an increasing amount of applied torque.

Figure 1B:
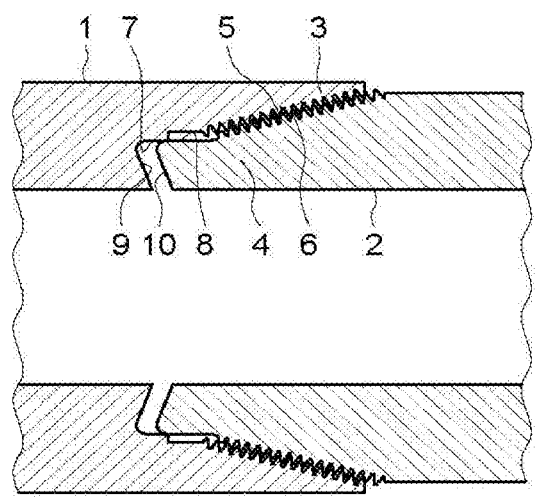

At the point of engagement 15, the first sealing surface 7 of the first tubular component 1 comes into contact with the second sealing surface 8 of the second tubular component 2. The tubular components 1 and 2 are then in a so-called sealing position, shown in FIG. 1B.

The high friction induced by the contact between the sealing surfaces 7 and 8 results in a change in gradient and in particular in an increase in the amount of torque applied by rotation, defining a second portion 16 of the curve obtained.

Figure 1C:
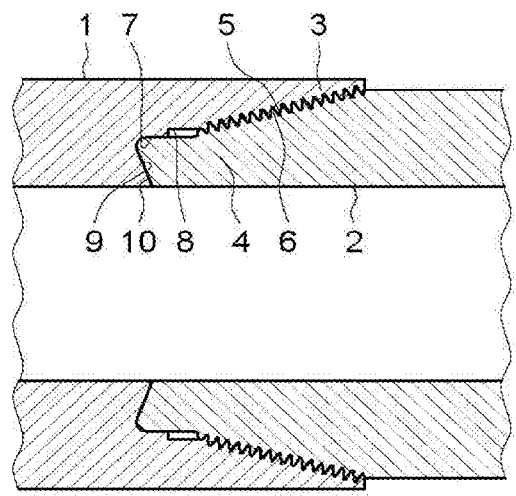

The rotation of the first tubular component 1 relative to the second tubular component then ends at a shouldering point 17. The tubular components are in a so-called shouldering position, shown in FIG. 1C, in which the first shoulder 9 of the first tubular component 1 comes into contact with the second shoulder 10 of the second tubular component 2. The increased friction between the faces of the respective shoulders 9 and 10 is added to the friction resulting from the contact between the threadings 5 and 6 and the friction between the sealing surfaces, which results in another change in gradient and a consequent increase in the torque applied, defining a third portion 18 of the curve obtained, extending as far as an end point 19 at which the tubular components have reached the end position.

The term 'end position' must be understood herein as a position of the first and second tubular components 1 and 2 in which a maximum screwing torque is applied and the coupling is complete.

In a step subsequent to obtaining 13 the torque-turn curve, the method comprises a step 20 of comparing one or more parameters of the curve obtained with one or more reference curves in a database.

Each reference curve in the database is associated with an assessment of the quality of the coupling of first and second reference tubular components produced prior to the coupling of the first and second tubular components 1 and 2.

Moreover, the comparison step 20 comprises comparing the shape of at least one portion of the curve obtained in order to detect any potential unusual shape of the curve obtained, for example that is induced by an abnormal variation in the torque.

After comparison, the method thus comprises a step 21 of assessing the quality of the coupling of the first and second tubular components 1 and 2 according to the step 20 of comparing the curve obtained with the reference curves.

Advantageously, each reference curve in the database is associated with a coupling status representative of the conform or non-conform status of the coupling of first and second reference tubular components.

The coupling status of each reference curve in the database is preferably allocated by human appraisal. An expert or any other competent person can validate the coupling of the reference tubular components by associating the "conform" status with the reference curve obtained, if he/she considers the coupling to have been successful. Conversely, the expert invalidates the coupling of the reference tubular components by associating the "non-conform" status with the reference curve obtained, if he/she considers the coupling to have failed. A reliable extensive database can thus be obtained.

The comparison step 20 can comprise comparing the shape of at least one of the three portions 14, 16 and 18 of the torque-turn curve obtained, i.e. from the engagement of the first tubular component 1 on the second tubular component 2 until contact is made between the first sealing surface 7 of the first tubular component 1 and the second sealing surface 8 of the second tubular component; and/or from the time of contact between the first sealing surface 7 of the first tubular component 1 and the second sealing surface 8 of the second tubular component 2 until contact is made between the first shoulder 9 of the first tubular component 1 and the second shoulder 10 of the second tubular component 2; and/or from the time of contact between the first shoulder 9 of the first tubular component 1 and the second shoulder 10 of the second tubular component 2 until the end position corresponding to the end point 19 is reached.

Preferentially, the comparison step and the assessment step are carried out by an algorithm, or "artificial intelligence", aided by machine learning using the database of reference curves. After obtaining the torque-turn curve associated with the assessment of the quality of the coupling of the first and second tubular components 1 and 2, the curve obtained is added to the database to enhance the database and train the algorithm in order to increase the accuracy thereof when comparing and assessing the coupling quality. The resulting automation of the assessment of the quality of the coupling of the tubular components does away with the need for the human factor and thus increases assessment accuracy.

Advantageously, the curve obtained can be intended to be associated with a coupling status representative of the conform or non-conform status of the coupling of the first and second reference tubular components, after verifying the coupling status, which is carried out by human appraisal, before being added to the database.

Each reference curve in the database that is associated with a non-conform status can also be associated with an additional status characterising the problem generating the non-conformity of the coupling of the tubular components.

Preferably, the machine learning algorithm is configured so as to obtain an average reference curve from the database of reference curves, and configured so as to calculate the distance between the curve obtained and the average reference curve.

Furthermore, the algorithm can be of the DTW (Dynamic Time Warping) type. Advantageously, such an algorithm, intended to measure the similarity between two sequences which can vary over time, can be used, in this case, to assess the distance between the curve obtained and the average reference curve calculated. In practice, each curve can be converted into a matrix. A distance matrix can be calculated. The paths between the start point and the end point are calculated and the path having the minimum sum of the distances is determined. Reference can be made to Silva, D. F., Batista, G. E. A. P. A. (2015). Speeding Up All-Pairwise Dynamic Time Warping Matrix Calculation.

A calculated reference curve is established by determining the average of screwing curves corresponding to validated screwing operations for connections of the same model, same steel grade and same nominal diameter. There can thus be a calculated reference curve for a VAM© TOP connection of grade L80 13Cr having a nominal outer diameter of 88.9 mm and a calculated reference curve for a VAM© 21 connection of grade VM110 having a nominal outer diameter of 139.7 mm, or a calculated reference curve for a VAM© 21 connection of grade VM110 having a nominal outer diameter of 168.3 mm.

In an alternative embodiment, the step of comparing the shape of the torque-turn curve obtained with one or more reference curves can comprise comparing the linearity of at least one portion of the curve obtained.

In this respect, the algorithm is advantageously configured so as to compare the linearity of the portion of the curve obtained from the engagement of the first and second tubular components 1 and 2 until contact is made between the first shoulder 9 of the first tubular component 1 and the second shoulder 10 of the second tubular component 2 with one or more reference curves in the database. More specifically, the non-linearity of the curve before the shouldering position, i.e. the appearance of abnormal variations in torque, is indicative of the non-conformity of the coupling.

In an alternative embodiment, the algorithm is configured so as to compare the linearity of the portion of the curve obtained from the time of contact between the first sealing surface of the first tubular component and the second sealing surface of the second tubular component until contact is made between the first shoulder of the first tubular component and the second shoulder of the second tubular component.

In an alternative or complementary embodiment, the algorithm can be configured so as to compare the linearity of the portion of the curve obtained from the time of contact between the first shoulder of the first tubular component and the second shoulder of the second tubular component until reaching the end position. In practice, the linearity can be assessed by the L2 norm calculation of the difference between the curve obtained and the line segment connecting the shouldering and end points. The appearance of abnormal variations in the torque relative to the linearity of the increase in torque for this curve portion is particularly indicative of the non-conformity of the coupling.

Moreover, the algorithm can be configured so as to compare the downward-sloping portions of the curve obtained with one or more reference curves in the database.

The algorithm can be configured so as to calculate the sum of the torque losses for the curve portion located between the start of screwing and the bearing point, the torque losses resulting in curve portions for which said curve is downward-sloping. In practice, the downward-sloping portions of said curve portion are identified and the corresponding torque losses are added up. This results in high-frequency torque variations.

Advantageously, the comparison between the shape of the torque-turn curve obtained can comprise calculating and comparing, by way of the algorithm, the length of the portion of the curve obtained from the time of contact between the first sealing surface 7 of the first tubular component 1 and the second sealing surface 8 of the second tubular component 2 until the end position is reached, with one or more reference curves in the database.

Figure 4:
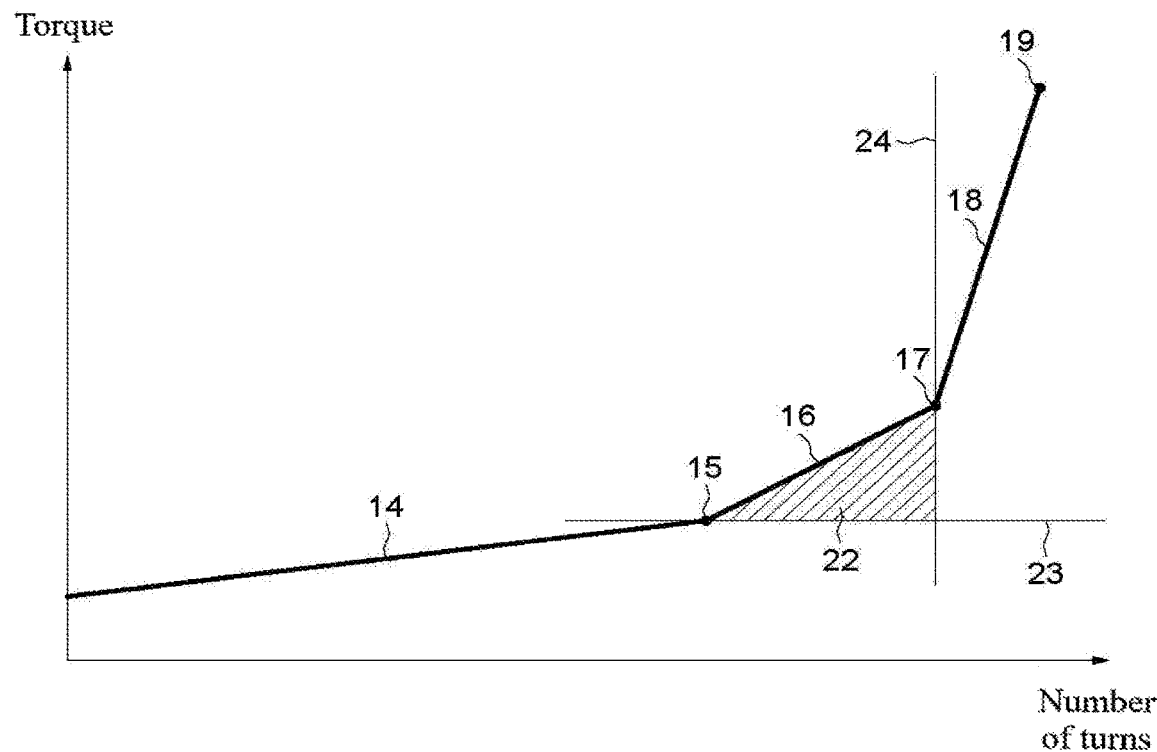
FIG. 4 shows the calculation of the area beneath the torque-turn curve obtained between a sealing position and a shouldering position.
Figure 5:
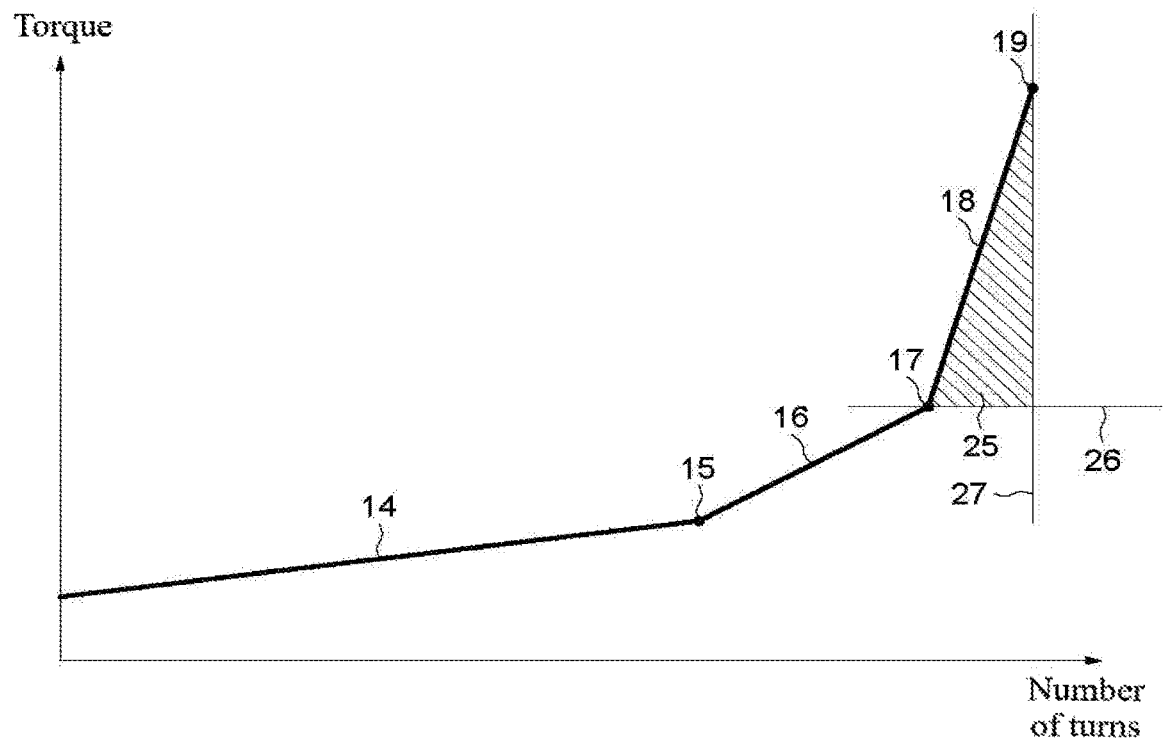
FIG. 5 shows the calculation of the area beneath the torque-turn curve obtained between a shouldering position and an end position.

Preferably, the algorithm is further configured so as to calculate the area 22 of the triangle shown in FIG. 4, which is delimited by: the portion 16 of the curve obtained from the time of contact between the first sealing surface 7 of the first tubular component 1 and the second sealing surface 8 of the second tubular component 2 until contact is made between the first shoulder 9 of the first tubular component 1 and the second shoulder 10 of the second tubular component 2; a straight line of zero gradient passing through the engagement point 15 or point of contact between the first sealing surface 7 of the first tubular component 1 and the second sealing surface 8 of the second tubular component 2; and a vertical straight line 24 passing through the shouldering point 17 or point of contact between the first shoulder 9 of the first tubular component 1 and the second shoulder 10 of the second tubular component 2.

According to an alternative embodiment or additionally, the algorithm can be configured so as to calculate the area 25 of the triangle delimited by the portion 18 of the curve obtained from the time of contact between the first shoulder 9 of the first tubular component 1 and the second shoulder 10 of the second tubular component 2; a straight line 26 of zero gradient passing through the point 17 of contact between the first shoulder 9 of the first tubular component 1 and the second shoulder 10 of the second tubular component 2; and a vertical straight line 27 passing through the point 19 on the curve obtained at the end position.

The algorithm can thus be configured so as to compare the area 22, 25 calculated with one or more reference curves in the database.

Furthermore, the machine learning algorithm can be of the t-SNE (t-distributed stochastic neighbour embedding) type. The t-SNE algorithm is a technique for dimensionality reduction for data visualisation. It is a non-linear method allowing a set of points of a high-dimensional space to be represented in a two- or three-dimensional space, the data can then be visualised via a scatter diagram.

According to one embodiment, the algorithm can further be configured so as to carry out data clustering, preferably k-means clustering and/or DBSCAN (density-based spatial clustering of applications with noise).

Advantageously, the algorithm is configured so as to carry out a principal component analysis (PCA) based on one or more parameters of the curve obtained, in order to assess the quality of the coupling. The principal component analysis consists of transforming variables linked to one another into new variables decorrelated from one another.

In a more advantageous manner, the PCA is carried out based on parameters including at least one of the parameters from among: the number of linear curve portions of the curve obtained; the number of downward-sloping portions of the curve obtained; and the value of the gradient of the third portion 18 of the curve obtained, i.e. between the shouldering position and the end position, after linear regression.

In addition to the comparison of the shape of a portion of the curve obtained, the comparison step 20 can be carried out by also taking into consideration one or more of the following four parameters: the value of the torque when the first shoulder 9 of the first tubular component 1 comes into contact with the second shoulder 10 of the second tubular component 2; the number of turns performed by the first tubular component 1 from the time of contact between the first shoulder 9 of the first tubular component 1 and the second shoulder 10 of the second tubular component 2 until reaching the end position of the tubular components; the gradient of the portion of the curve from the time of contact between the shoulder of the first tubular component and the shoulder of the second tubular component until reaching the end position; and the value of the torque in the end position.

Preferably, the PCA is also carried out based on one or more of the aforementioned four parameters.

In the different embodiments described, the methods can comprise a step of normalising the curves obtained and the reference curves prior to applying the algorithm according to the invention. This substantially improves the result of the assembly conformity assessment.

The invention claimed is:

1. A method for coupling a first tubular component including a threaded portion with a second tubular component including a threaded portion, which comprises:
   engaging the first tubular component on the second tubular component;
   rotating the first tubular component relative to the second tubular component in order to screw the threaded portions together;
   obtaining a set of points constituting a curve that represents the torque applied when screwing the first tubular component into an end position as a function of the number of turns performed by the first tubular component relative to the second tubular component;
   comparing one or more parameters of the curve obtained with one or more reference curves in a database of reference curves in which each reference curve is associated with an assessment of a quality of a coupling of first and second reference tubular components; and
   assessing a quality of the coupling of the first and second tubular components according to the step of comparing the curve obtained with the one or more reference curves,
   wherein the comparing step comprises comparing the shape of at least one portion of the curve obtained,
   wherein at least one reference curve in the database is associated with a coupling status representative of a conform status, and at least one reference curve in the database is associated with a coupling status representative of a non-conform status of the coupling of the first and second reference tubular components,
   wherein each reference curve in the database that is associated with the non-conform status is associated with an additional status that characterizes a problem that generated the non-conform status of the coupling of the reference tubular components, and
   wherein an algorithm is configured to calculate a sum of the torque losses for a plurality of portions of the curve that include downward-sloping portions of the curve located between the start of screwing and a bearing point.

2. The method according to claim 1, wherein an allocation of the coupling status of each reference curve in the database is carried out by human appraisal.

3. The method according to claim 1, wherein the comparing step comprises comparing the shape of a portion of the curve obtained from the engagement of the first tubular component on the second tubular component until contact is made between a first sealing surface of the first tubular component and a second sealing surface of the second tubular component, and/or of a portion of the curve obtained from the time of contact between the first sealing surface of the first tubular component and the second sealing surface of the second tubular component until contact is made between a first shoulder of the first tubular component and a second shoulder of the second tubular component, and/or of a portion of the curve obtained from the time of contact between the first shoulder of the first tubular component and the second shoulder of the second tubular component until the end position is reached.

4. The method according to claim 1, wherein the comparing step and the assessing step are performed by the algorithm aided by machine learning using the database of reference curves, after obtaining the curve associated with the assessment of the quality of the coupling of the first and second tubular components, the curve obtained being added to the database.

5. The method according to claim 4, wherein the algorithm is configured so as to compare the linearity of a portion of the curve obtained from the engagement of the first and second tubular components until contact is made between a first shoulder of the first tubular component and a second shoulder of the second tubular component with one or more reference curves in the database.

6. The method according to claim 4, wherein the algorithm is configured so as to compare downward-sloping portions of the curve obtained with one or more reference curves in the database.

7. The method according to claim 4, wherein the algorithm is configured so as to obtain an average reference curve from the database of reference curves, and configured so as to calculate a distance between the curve obtained and the average reference curve.

8. The method according to claim 4, wherein the algorithm is configured so as to calculate and compare, with one or more reference curves in the database, the area of a triangle delimited by a portion of the curve obtained from a time of contact between a first sealing surface of the first tubular component and a second sealing surface of the second tubular component until contact is made between a first shoulder of the first tubular component and a second shoulder of the second tubular component, a straight line of zero gradient passing through the point of contact between the first sealing surface of the first tubular component and the second sealing surface of the second tubular component, and a vertical straight line passing through the point of contact between the first shoulder of the first tubular component and the second shoulder of the second tubular component, and/or configured so as to calculate the area of a triangle delimited by a portion of the curve obtained from the time of contact between the first shoulder of the first tubular component and the second shoulder of the second tubular component, a straight line of zero gradient passing through the point of contact between the first shoulder of the first tubular component and the second shoulder of the second tubular component, and a vertical straight line passing through the point on the curve obtained in the end position.

9. The method according to claim 2, wherein the algorithm is configured so as to calculate a length of a portion of the curve obtained from a time of contact between a first sealing surface of the first tubular component and a second sealing surface of the second tubular component until reaching the end position.

10. The method according to claim 4, wherein the algorithm is configured so as to carry out a principal component analysis performed based on a plurality of parameters of the curve obtained.

11. The method according to claim 4, wherein the algorithm is configured so as to carry out data clustering, k-means clustering and/or density-based clustering.

12. The method according to claim 4, wherein the algorithm is of the t-SNE type.

13. The method according to claim 4, wherein the algorithm can be configured so as to compare the linearity of a portion of the curve obtained from a time of contact between a first shoulder of the first tubular component and a second shoulder of the second tubular component until reaching the end position.

\* \* \* \* \*